(12) United States Patent  (10) Patent No.: US 8,964,372 B2
Morton                    (45) Date of Patent:     Feb. 24, 2015

(54) DOCKING STATION (75) Inventor: Daniel M. Morton, Arlington, MA (US)

(73) Assignee: Bose Corporation, Framingham, MA (US)

( * ) Notice: Subject to any disclaimer, the term of this patent is extended or adjusted under 35 U.S.C. 154(b) by 257 days.

(21) Appl. No.: 12/749,685

(22) Filed: Mar. 30, 2010

(65) Prior Publication Data
US 2011/0242754 A1 Oct. 6, 2011

(51) Int. Cl.
G06F 1/16 (2006.01)
H01Q 1/24 (2006.01)
H01Q 1/46 (2006.01)

(52) U.S. Cl.
CPC .............. *G06F 1/1632* (2013.01); *H01Q 1/242* (2013.01); *H01Q 1/46* (2013.01)
USPC .................... 361/679.41; 361/679.4; 439/688

(58) Field of Classification Search
CPC ... G06F 1/1632; G06F 1/1626; G06F 1/1607; G06F 1/1637; G06F 1/26; G06F 1/16; G06F 1/1654; H05K 5/0204; H05K 5/0234; H05K 7/00; H05K 7/14; H05K 7/1487; H01R 33/00; H01R 13/11; H01R 13/6591; H01R 33/945; H01R 43/00

USPC ............... 361/679.4, 679.41, 679.55, 679.56; 439/669, 668, 638, 688, 689, 690
See application file for complete search history.

(56) References Cited

U.S. PATENT DOCUMENTS

| 5,901,367 A * | 5/1999 | Toh .............................. 455/575.7 |
| 6,908,324 B1 * | 6/2005 | Morley et al. .................. 439/218 |
| 7,528,596 B2 * | 5/2009 | Ivannikov et al. ........ 324/750.16 |
| 7,889,139 B2 * | 2/2011 | Hobson et al. ................. 343/702 |
| 8,127,066 B2 * | 2/2012 | Abraham et al. .............. 710/303 |
| 8,264,829 B2 * | 9/2012 | Moser ....................... 361/679.29 |
| 2007/0101039 A1 | 5/2007 | Rutledge et al. |
| 2008/0165066 A1 * | 7/2008 | Tiscareno et al. .............. 343/702 |
| 2008/0254831 A1 * | 10/2008 | Mukai et al. ................... 455/557 |
| 2009/0175458 A1 * | 7/2009 | Smith ............................. 381/28 |

* cited by examiner

*Primary Examiner* — Jinhee Lee
*Assistant Examiner* — Ingrid Wright
(74) *Attorney, Agent, or Firm* — Brian M. Dingman; Dingman, McInnes & McLane, LLP (57) ABSTRACT

A docking station for a portable electronic device that includes a first port and one or both of a second port and a jack. The docking station has a first electrical connector that fits into the first port when the portable electronic device is coupled to the docking station and a second electrical connector that is adapted to be electrically coupled to the second port or the jack when the portable electronic device is coupled to the docking station.

24 Claims, 11 Drawing Sheets

DOCKING STATION

BACKGROUND

Docking stations are used for portable electronic devices such as portable media players, including audio players such as MP3 players, and audio/video players, for example. An example of a portable media player is the Apple® IPod®.

Docking stations often include a multi-pin main connector that mates with a main port in the portable electronic device. Necessary signals are transferred back and forth between the docking station and the device over this main connector.

Some portable electronic devices include one or more functionalities that require or can benefit from access through a second port or jack on the device. An example is that some MP3 players include an FM radio with its antenna input coupled to the headphone jack; in this case the headphone cord acts as the radio's antenna.

Unfortunately, these portable electronic devices sometimes have the connector port and the second port or jack (such as the headphone jack) on the same end surface of the device. If this is the case, when the device is coupled to the docking station through the port, the second port or jack lies against the docking area of the dock and thus is inaccessible. As a result, functionality that requires access to the second port or jack is not available when the device is coupled to the docking station.

SUMMARY

In general, in one aspect the invention features a docking station for a portable electronic device that includes a first port, and one or both of a second port and a jack, the docking station comprising a first electrical connector that fits into the first port when the portable electronic device is coupled to the docking station and a second electrical connector that is adapted to be electrically coupled to the second port or the jack when the portable electronic device is coupled to the docking station.

Various implementations of the invention may include one or more of the following features. The second electrical connector may be adjacent to the first electrical connector. The docking station may further comprise a docking area in which the first electrical connector is located, and the second electrical connector may be accessible over at least some of the docking area. The second electrical connector may be located in the docking area on both sides of and essentially parallel to the first electrical connector. The docking area may define a surface adjacent to the first electrical connector, and the second electrical connector may be located below this surface. The docking station may further comprise an opening in the surface above the second electrical connector.

Various other implementations of the invention may include one or more of the following features. The second electrical connector may be compliantly mounted to the docking station. The docking station may further comprise a radio antenna electrically coupled to an antenna output contact of the second electrical connector. The docking station may further comprise a plug member comprising a first end that is adapted to removably seat in the second port or the jack. The plug member may further comprise a second end that is adapted to be electrically coupled to the second electrical connector. The plug member may be adapted to be removably coupled to both the second electrical connector and the second port or the jack. The first end of the plug member may comprise a first plug that defines a first external electrical contact, and the second end of the plug member may comprise a second plug that defines a second external electrical contact that is electrically coupled to the first external electrical contact. The portable electronic device may include a radio with its antenna input coupled to an antenna input contact of the jack, and the docking station may further comprise a radio antenna electrically coupled to an antenna output contact of the second electrical connector. The first external electrical contact of the first plug may electrically connect to the antenna input contact of the jack when the first plug is seated in the jack, and the second external electrical contact of the second plug may electrically connect to the antenna output contact of the second electrical connector when the second plug is electrically coupled to the second electrical connector, to thereby electrically couple the antenna to the radio through the plug member.

Various other implementations of the invention may include one or more of the following features. The first end of the plug member may comprise a connector adapted to fit into the second port of the portable electronic device, the connector defining a first electrical contact. The second end of the plug member may comprise a plug that defines a second external electrical contact that is electrically coupled to the first electrical contact. The portable electronic device may include a power supply that is adapted to be supplied with power through one or more input power contacts of its second port. The second electrical connector may comprise an output power contact, and the first electrical contact of the plug member connector may be a power contact that electrically connects to an input power contact of the second port when the connector is seated in the second port. The second external electrical contact of the plug may electrically connect to the output power contact of the second electrical connector when the plug is electrically coupled to the second electrical connector, to thereby electrically couple the output power contact of the second electrical connector to the power supply of the portable electronic device through the plug member.

Various other implementations of the invention may include one or more of the following features. The portable electronic device may comprise a radio with its antenna input coupled to an antenna input contact of the jack. The second electrical connector may comprise a plug member comprising a plug that is adapted to removably seat in the jack, the plug defining an external contact that electrically connects to the antenna input contact of the jack when the plug is seated in the jack. The plug member may be movably coupled to the docking station such that the position of the plug relative to the first electrical connector can be changed. The docking station may define a plurality of detents that define a plurality of plug positions. The portable electronic device may be a portable media player with the first port and the second port or jack located at the same end of the housing.

Various other implementations of the invention may include one or more of the following features. The second electrical connector may comprise a female connector that defines a series of internal electrical contacts arranged in one or more rows. The docking area may define a surface adjacent to the first electrical connector, and the internal electrical contacts of the female connector may be located below this surface. The female connector may define at least two rows of internal electrical contacts, the rows arranged essentially parallel to one another and at different distances below the surface.

In general, in another aspect the invention features a docking station for a portable media player that includes a first port, and one or both of a second port and a jack. The docking station comprises a first electrical connector that fits into the first port when the portable media player is coupled to the docking station and a docking area in which the first electrical connector is located, the docking area comprising a surface that defines an opening adjacent to the first electrical connector. The docking station further comprises a second electrical connector adjacent to the first electrical connector and adapted to be electrically coupled to the second port or the jack when the portable electronic device is coupled to the docking station. The second electrical connector is located directly below the opening in the surface of the docking area such that the second electrical connector is accessible over at least some of the docking area. There is a plug member comprising a first end that is adapted to removably seat in the second port or the jack and a second end that is adapted to be electrically coupled to the second electrical connector. The plug member is adapted to be removably coupled to both the second electrical connector and the second port or the jack.

Various implementations of the invention may include one or more of the following features. The first end of the plug member may comprise a first plug that defines a first external electrical contact. The second end of the plug member may comprise a second plug that defines a second external electrical contact that is electrically coupled to the first external electrical contact. The portable electronic device may include a radio with its antenna input coupled to an antenna input contact of the jack. The docking station may further comprise a radio antenna electrically coupled to an antenna output contact of the second electrical connector. The first external electrical contact of the first plug may electrically connect to the antenna input contact of the jack when the first plug is seated in the jack. The second external electrical contact of the second plug may electrically connect to the antenna output contact of the second electrical contact when the second plug is electrically coupled to the second electrical connector, to thereby electrically couple the antenna to the radio through the plug member.

Various other implementations of the invention may include one or more of the following features. The first end of the plug member may comprise a connector adapted to fit into the second port of the portable electronic device, the connector defining a first electrical contact. The second end of the plug member may comprise a plug that defines a second external electrical contact that is electrically coupled to the first electrical contact. The portable electronic device may include a power supply that is adapted to be supplied with power through one or more input power contacts of its second port. The second electrical connector may comprise an output power contact. The first electrical contact of the plug member connector may be a power contact that electrically connects to an input power contact of the second port when the connector is seated in the second port. The second external electrical contact of the plug may electrically connect to the output power contact of the second electrical connector when the plug is electrically coupled to the second electrical connector, to thereby electrically couple the output power contact of the second electrical connector to the power supply of the portable electronic device through the plug member.

In general, in another aspect the invention features a system for electrically coupling a functionality of a docking station to a functionality of a portable electronic device, wherein the portable electronic device is adapted to be coupled to the docking station, the portable electronic device including a jack or port to which the portable electronic device functionality is electrically coupled. The system comprises a double-ended plug member with a first conductive end that is electrically coupled to a second conductive end. The first end of the plug member is adapted to be insertable into and removable from the jack or port of the portable electronic device. A conductive member is carried by the docking station and is electrically coupled to the functionality of the docking station. The conductive member is located and arranged such that when the portable electronic device with the first end of the plug member inserted into its jack or port is coupled to the docking station the second end of the plug member is electrically coupled to the conductive member, to thereby couple the functionality of the docking station to the functionality of the portable electronic device through the conductive member and the plug member.

Various implementations of the invention may include one or more of the following features. The conductive member may comprise an exposed conductor. The conductor may be compliantly mounted to the docking station. The conductor may be mounted for vertical compliance with respect to the docking station. The conductive member may comprise an electrical connector. The portable electronic device may comprise a portable media player, the portable media player functionality may comprise a radio, and the docking station functionality may comprise an antenna.

In general, in another aspect the invention features a method for providing a radio antenna to a radio of a portable media player that is adapted to be coupled to a docking station, the portable media player including a female electrical connector to which the antenna input of the radio is coupled. The method comprises providing a radio antenna for the docking station, providing an electrical connector for the docking station, the electrical connector electrically coupled to the antenna. A conductive plug that is insertable into and removable from the female electrical connector of the portable media player is provided. The plug is inserted into the female electrical connector and either together with the plug insertion into the female electrical connector or after the plug is inserted into the female electrical connector, the portable media player is coupled to the docking station such that the plug is electrically coupled to the electrical connector, to thereby couple the antenna to the radio through the electrical connector and the plug.

DETAILED DESCRIPTION

This disclosure is related to a docking station for a portable electronic device such as a portable media player, including MP3 players and the like. The portable electronic device includes a first port and either one or both of a second port and a jack. The docking station includes an electrical connector that is inserted into the first port when the device is coupled to the docking station. The docking station also comprises a second electrical connector that is adapted to be electrically coupled to the second port or the jack when the portable electric device is coupled to the docking station. This second electrical connector can be a separate connector that is removably coupled to either the second port or the jack of the portable electronic device and is also coupled to the second electrical connector of the docking station. Alternatively, the second electrical connector can be built into the docking station. Typically, the second electrical connector is located adjacent to the first electrical connector of the docking station to accommodate a jack or port that is on the same face as and alongside of the port of the portable electronic device. Device functionality that is accessible through this second port or jack can then be accessed via the docking station.

Figure 1:
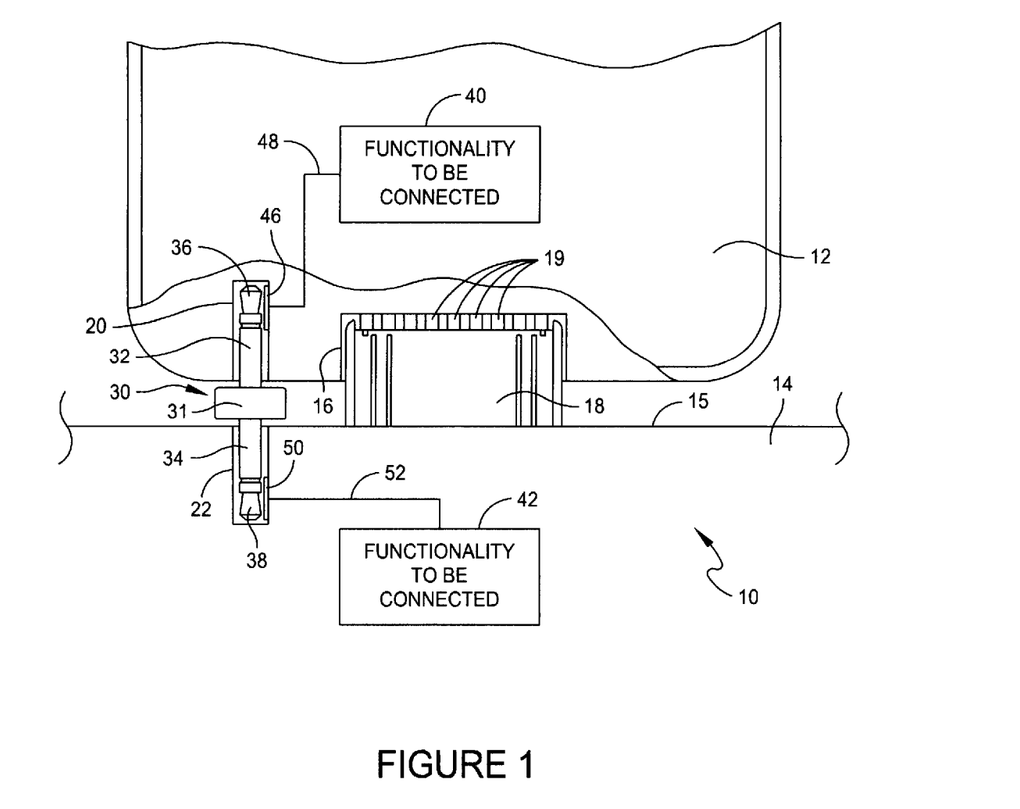
FIG. 1 is a schematic partial cross-sectional view of a docking station and a portable electronic device coupled to the docking station.

In FIG. 1, a system 10 electrically couples portable electronic device 12 and docking station 14. Docking station 14 electrically connects to one or more functions that are accomplished or enabled by device 12. Typically, docking station 14 couples control, charging and audio signals between it and device 12. In one example, docking station 14 can include one or more electro-acoustic drivers for producing acoustic output from audio signals stored on portable electronic device 12. Device 12 defines main or docking port 16 that fits onto multi-pin connector 18 that projects upward from face 15 in the docking area of docking station 14. Electrical contacts 19 of connector 18 mate with contacts in the female connector or port 16. These connectors and the connection are not shown in detail as they are well known in the art for use with portable electronic devices that include a docking port 16.

Docking station 14 comprises a second electrical connector 22 which in this case is shown as a jack. However, the electrical connectivity can be accomplished with myriad other types of connectors such as other styles of female connectors, and male connectors including plugs or other single or multi-conductor connectors. Connector 22 itself (or an intermediate electrical structure termed in this embodiment a "plug member" 30), temporarily (i.e., removably) interconnects one or more functionalities 42 of docking station 14 to one or more functionalities 40 of portable electronic device 12. For use with portable electronic devices that have functionalities accessible via port 16, the functionality 40, 42 is typically an additional or alternative functionality that is not accessed through port 16. However, also contemplated are functionalities that can be accessed both through port 16 and through port or jack 20. Examples of functionalities discussed herein include a radio functionality and a power supply functionality, but the disclosure can be applied to other currently existing or yet to be developed functionalities of portable electronic devices that can benefit by electrical interconnection with functionalities of a docking station via the second electrical connector of the docking station.

Plug member 30 of this embodiment defines first end 32 and second end 34 connected through intermediate structural/grasping portion or housing 31. This is but one of myriad possible embodiments of a plug member that includes two ends that each carry one or more electrical contacts to accomplish temporary electrical interconnection between one or more contacts of connector 22 and one or more contacts of port or jack 20. In this case, each end is a plug and connector 22 is a jack or another type of female connector. Plug 32 carries external electrical contact 36 and plug 34 carries external electrical contact 38. Contacts 36 and 38 are electrically interconnected. When plug member 30 is coupled to connector 22 and connector 20, plug member 30 makes electrical interconnection of the docking station to the device through contacts 36 and 38. In this case, contact 36 will physically contact electrical contact 46 that is part of connector 20, while contact 38 will physically contact electrical contact 50 that is part of connector 22. When a plug accomplishes one or both ends of plug member 30, each plug can define one or a series of external electrical contacts, as is known in the art. These electrical contacts are electrically interconnected through the body of plug member 30 in a manner that is know in the art, often accomplished using nested cylindrical metallic members that are insulated from one another, or potentially using wires or other elongated conductors that run from end 32 to end 34.

Portable electronic device 12 carries functionality 40 that is to be connected to an external functionality through connector 20. This functionality is electrically coupled to contact 46 through conductor 48. Docking station 14 carries functionality to be connected 42 that is coupled to contact 50 through conductor 52. The result is that plug member 30 electrically connects functionality 42 to functionality 40 when device 12 is coupled to the docking station 14.

One functionality contemplated is the interconnection of an antenna to a radio carried by a portable electronic device, in which the antenna input is coupled through the device's headphone jack. In this case, the docking station carries an antenna, or a conductor that can act as an antenna represented by functionality 42. This antenna is electrically coupled to a contact of the second electrical connector of the docking station. Another functionality that is contemplated is the supply of power to a power supply of a device, such as the battery. The battery of portable electronic devices can sometimes be recharged through a connector other than the main port, for example a mini USB port such as port 86, FIG. 2A. In this case, properly conditioned power can be the additional functionality provided in the docking station and coupled to the second electrical conductor of the docking station for interconnection to the receiving functionality in the portable electronic device.

Figure 2A:
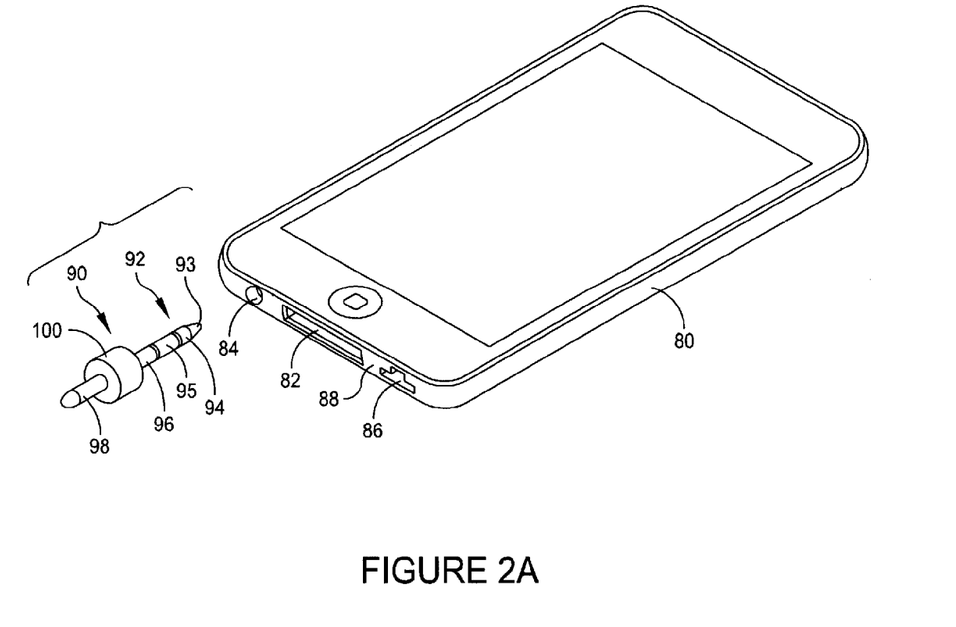
FIG. 2A is a perspective view of a plug member before it is inserted into a jack of a portable media player such as an MP3 player.
Figure 2B:
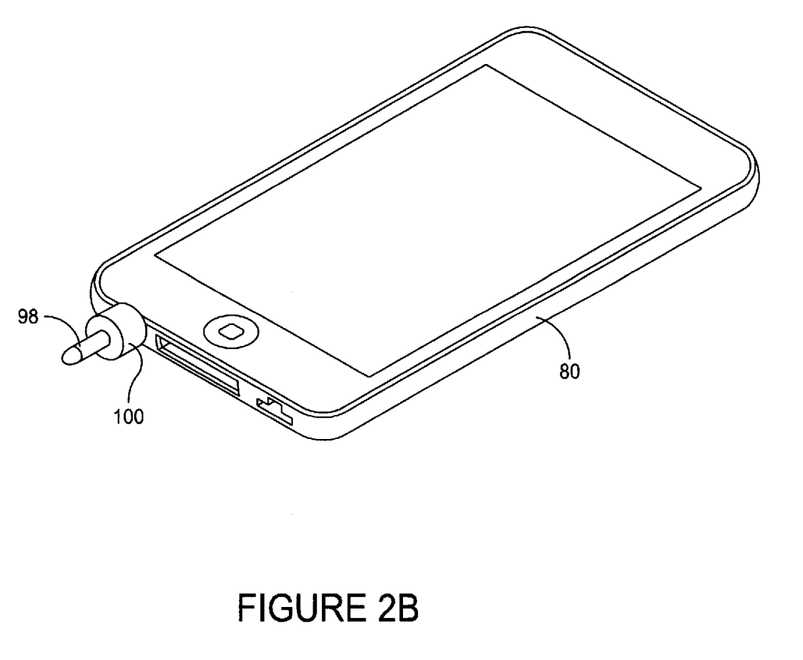
FIG. 2B shows the plug member inserted into the jack.
Figure 2C:
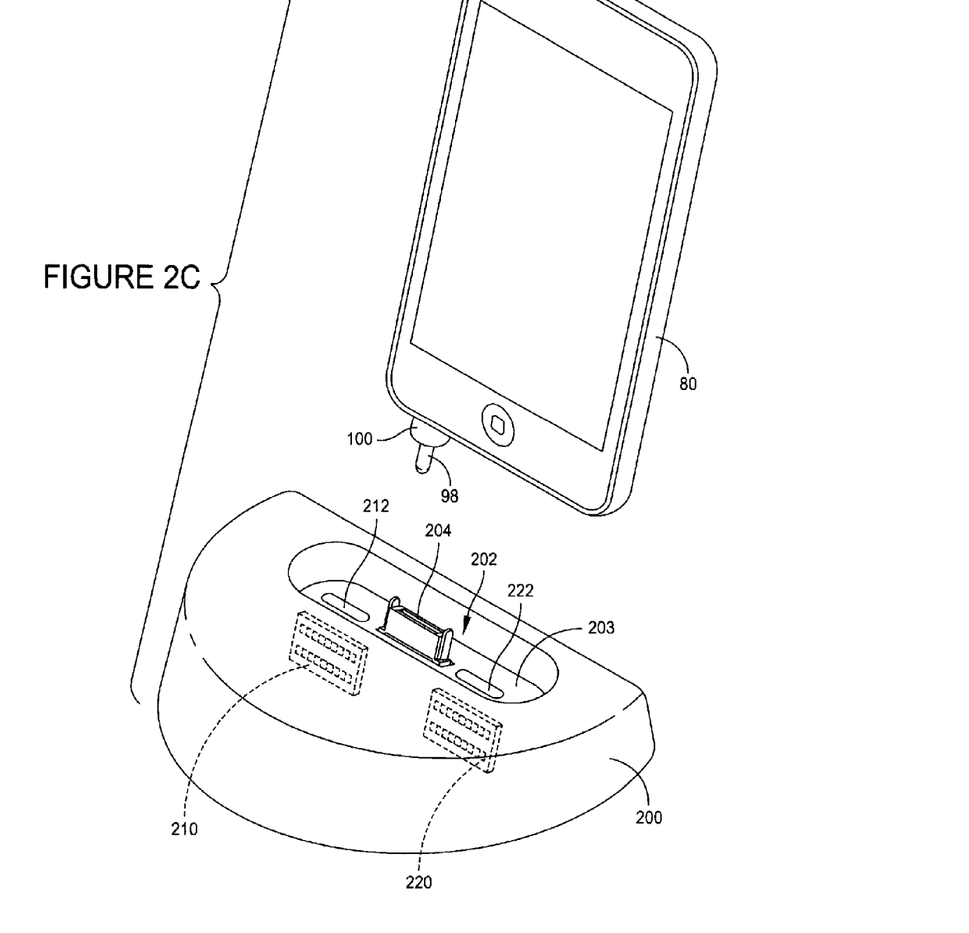
FIG. 2C shows the device and jack as combined in FIG. 2B before it is inserted into an embodiment of the docking station.

Two more specific embodiments are shown in FIGS. 2A through 2C and 3A through 3C, respectively. FIGS. 2A through 2C depict a separate plug member 90 that is used to make an interconnection between MP3 player 80 (e.g., an Apple® IPod®) and docking station 200. Plug member 90 defines first end 92 that is a plug that fits into headphone jack 84 of MP3 player 80. Plug 92 can define one, or more than one, external contacts, with four contacts 93-96 depicted. As described above, the number and arrangement of contacts in plug 92 is not a limitation. Second end 98 also comprises a plug, in this case defining a single electrical contact, which also is not a limitation. Intermediate housing/grip 100 allows the user to manipulate plug member 90.

MP3 player 80 is of a type that defines a multi-conductor main port 82 on one face, and also includes USB port 86 and headphone jack 84 on the same face, both located close to port 82 and generally lying along the longitudinal axis of port 82. When port 82 of device 80 is plugged into the main connector of a docking station, the openings of jack 84 and port 86 rest against or very close to the docking area of the docking station, and thus are electrically difficult to access.

This embodiment accomplishes interconnection to any one or more functions of device 80 that are accessible through jack 84. One example is an FM radio whose antenna input is coupled to a conductor in jack 84 such that when the user plugs headphones into jack 84, the headphone cord acts as an antenna and provides the signal to the radio via the antenna input contact in jack 84. In the present invention, one or more of conductors 93-96 are arranged to make contact with the antenna input connector in jack 84 when plug 92 is properly inserted into jack 84. As contact 98 is electrically connected to this contact of plug 92, an antenna can be coupled to the radio by coupling the antenna to contact 98.

Docking station 200 carries one or more (in this case two) connectors 210 and 220 that are located in docking station 200 close to standard main multi-pin connector 204 of the docking station that is designed to fit into port 82 of device 80.

As is the case with most docking stations, docking station 200 defines planar recessed docking area 202 surrounding main multi-pin docking connector 204. Docking area 202 accepts end 88 of device 80 that carries port 82. In the present embodiment, lower surface 203 of docking area 202 defines opening 212 that provides physical access from above to electrical connector 210 that is recessed below surface 203. This arrangement accommodates the fact that plug 98 projects outward from end 88 of device 80, and so the connector must be located below surface 203 for plug 98 to properly make electrical contact with the contact or contacts of connector 210. This embodiment depicts a second (identical) connector 220 on the other side of connector 204 and itself located below opening 222.

Docking station 200 need not carry two additional connectors, in addition to the main connector; it can carry one, or can carry more than two. However, connectors on each side of main connector 204 will accommodate portable electronic devices that have a second jack or port on either side of the main port 82. Also, connectors 210 and 220 are preferably (but need not be) elongated in a direction parallel to the central axis of connector 204. Openings 210 and 222 can be similarly elongated to provide access along the length of each of connectors 210 and 220. This design accommodates portable electronic devices with the second port or jack spaced at different distances from the main port. In other words, connectors 210 and 220 can accept plug 98, or another male connector, at different locations along their length to accommodate different styles of portable electronic devices.

Figure 3A:
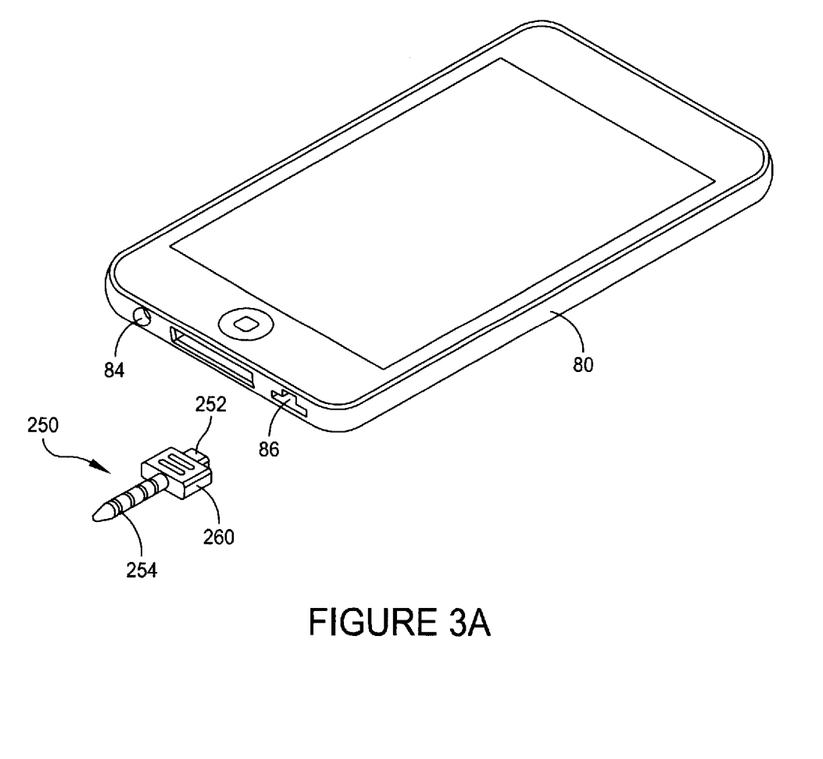
FIGS. 3A, 3B, and 3C are similar views for an alternative embodiment in which the plug member fits into a port in the portable electronic device.
Figure 3B:
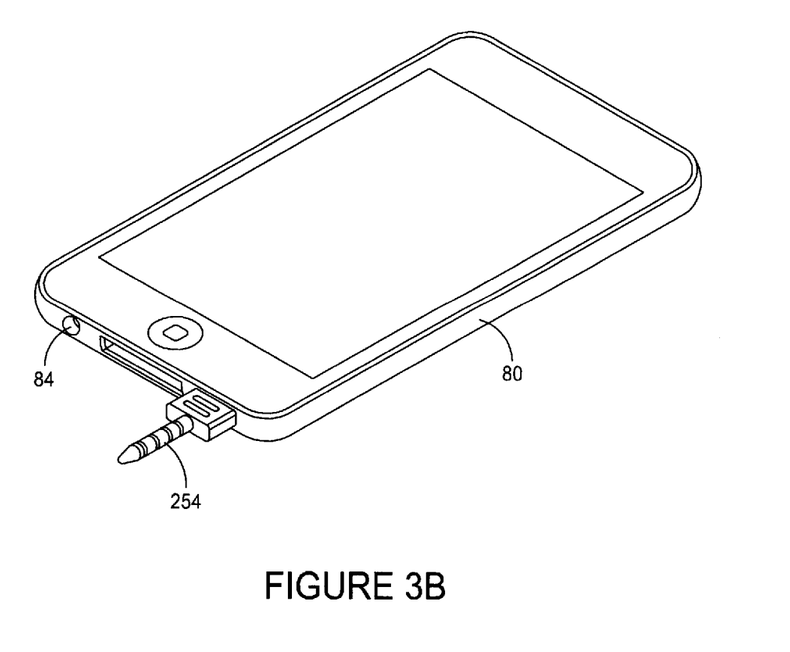
Figure 3C:
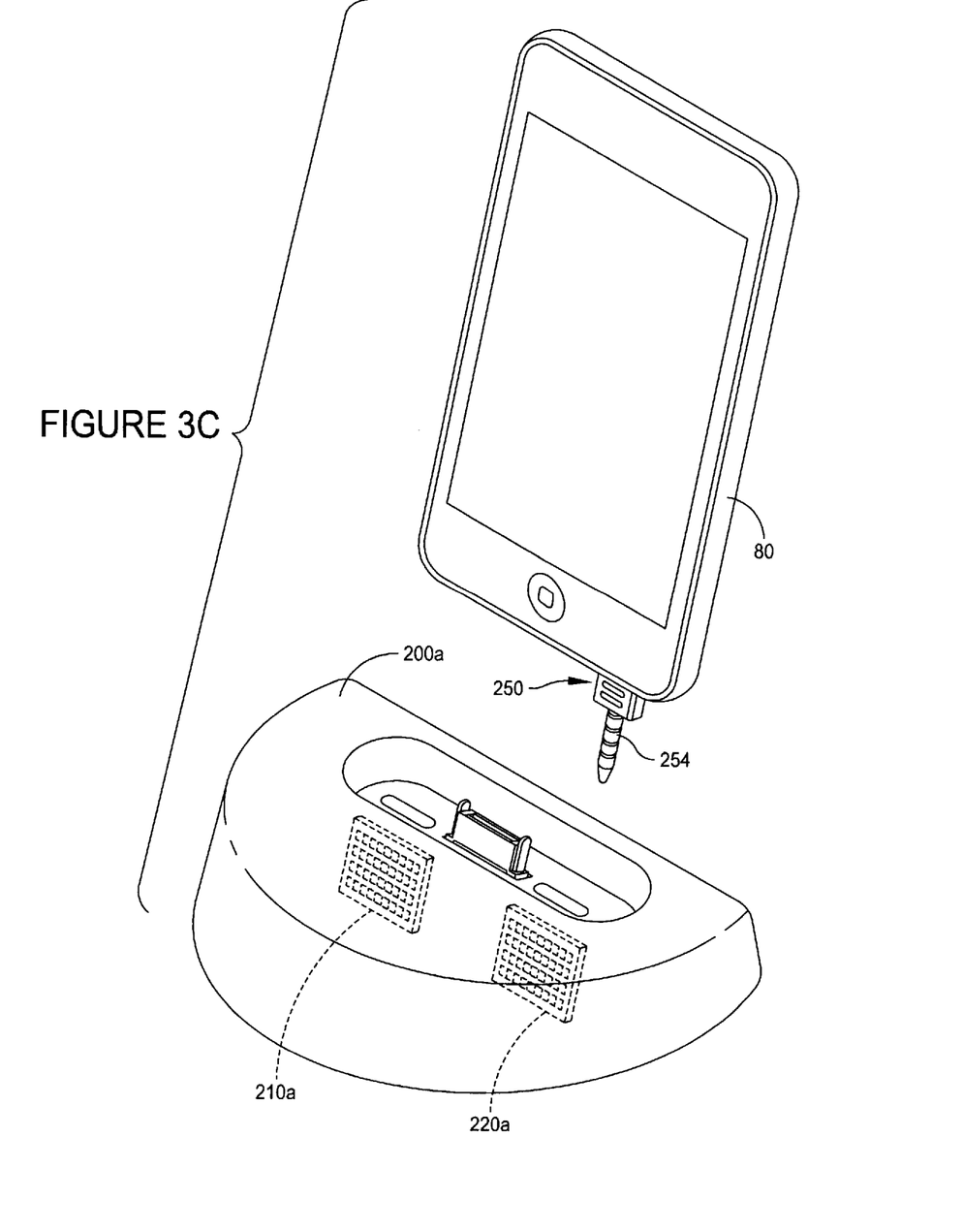

The embodiment shown in FIGS. 3A through 3C is very similar, but is designed to accommodate interconnection via USB port 86 rather than jack 84. In this case, plug member 250 defines first end 252 which includes a USB connector, and second end 254 which in this case is a multi-conductor plug. Central housing/grip 260 carries these two connectors. When connector 252 is inserted into port 86, plug 254 projects from device 80 and is received in connector 220a or 210a of docking station 200a. As shown in FIG. 3C, connector 220a can comprise one or multiple parallel rows of conductors (such as compliant fingers) that can accomplish electrical connection to one or more separate portions of plug 254 located along the length of the plug. Such multi-conductor connectors and multi-conductor plugs are known in the art. This arrangement can thus potentially accommodate more than one functionality interconnected between docking station 200a and device 80 via plug member 250; one per contact of plug 254.

Figure 4:
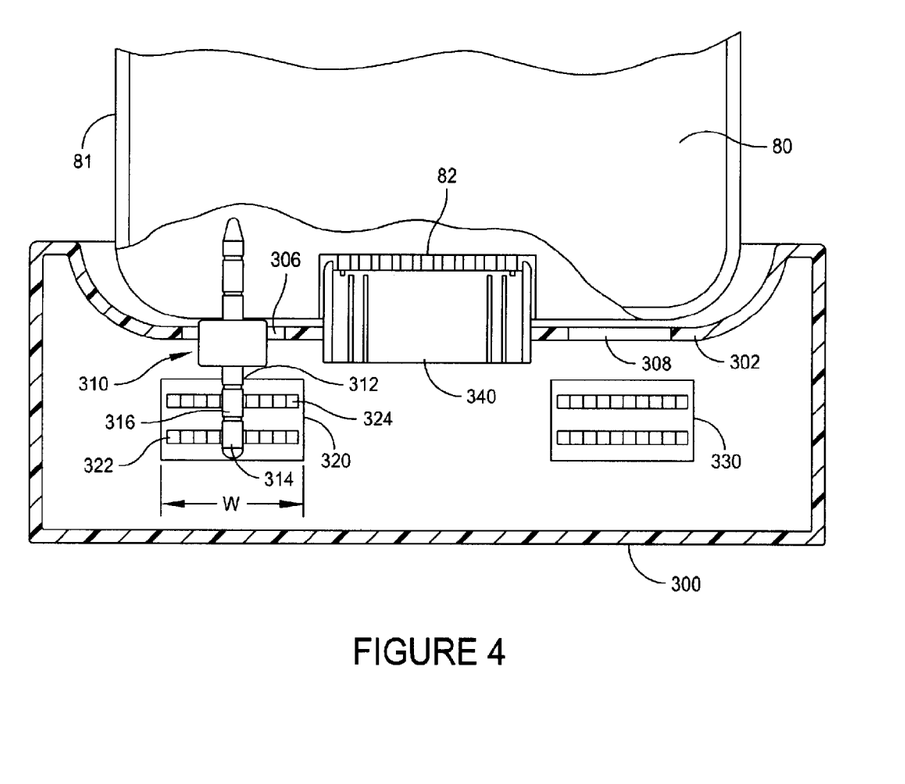
FIG. 4 is a schematic partial cross-sectional view of a portable electronic device coupled to a docking station.

FIG. 4 depicts another embodiment in which docking station 300 carries the traditional projecting multi-pin docking connector 340 that mates with the main port of portable electronic device 80. Docking station 300 carries two electrical connectors 330 and 320 that are each female connectors that define two parallel rows of contacts such as compliant fingers that can make good electrical connections with a plug or other male connector or conductor inserted into them. Rows 322 and 324 of connector 320 are identified. Obviously, only one, or more than two, contacts can be carried by connector 320 and/or connector 330. Plug member 310 is coupled to device 80 through the headphone jack (not shown). Plug end 312 defines two separate longitudinally-spaced contacts 314 and 316. Contact 314 makes electrical contact with one or more contacts in row 322, and contact 316 makes electrical contact with one or more contacts in row 324. Since connector 320 has a length (indicated as "W"), and can accept a plug inserted anywhere along this length, this arrangement will accommodate a jack in device 80 that is located adjacent to main port 82 almost anywhere on the end face between main port 82 and side 81. Since second connector 330 is similarly constructed and situated, docking station 300 can accommodate many styles of portable electronic devices that have a jack or port (or both) somewhere on the same end face as main port 82.

Figure 5A:
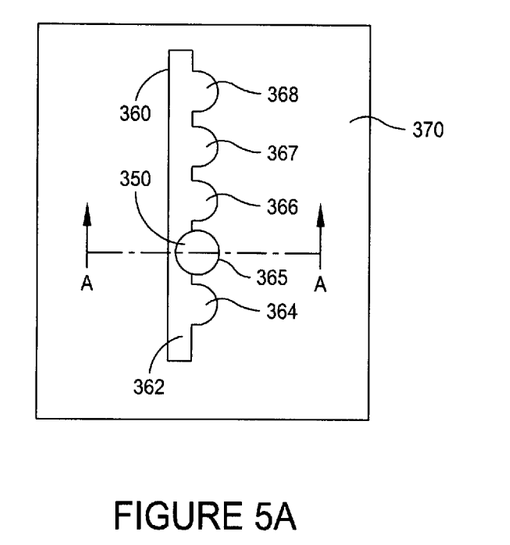
FIG. 5A is a schematic partial top view of an alternative embodiment.
Figure 5B:
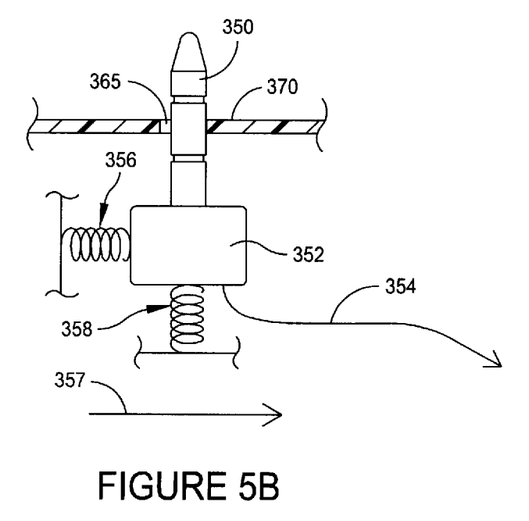
FIG. 5B is a schematic cross-sectional view taken along line A-A of FIG. 5A.

FIGS. 5A and 5B depict portions of an additional embodiment in which the second electrical connector of the docking station is built into the docking station rather than being a separate part as in several of the embodiments described above. This embodiment also illustrates one of many different ways that this second electrical connector can be made adjustable in its position relative to the first (main) electrical connector that is coupled to the main port of the portable electronic device. The embodiment contemplates a built-in second electrical connector, whether or not it is fixed, or whether or not its position is adjustable relative to the main multi-pin connector of the docking station. The embodiment also contemplates adjustability of position of the second electrical connector of the docking station, whether or not it is built into the docking station.

The second electrical connector of the docking station in this embodiment comprises plug 350 that projects above surface 370 of the docking area that is proximate to the main electrical connector of the docking station (not shown in these figures). Plug 350 projects upward through opening 365. Plug base 352 supports plug 350.

Docking area surface 370 defines an elongated opening 360 that defines a plurality of separate connector positions along its length. Typically, this length is parallel to the longitudinal axis of the main electrical connector on the docking station, to accommodate connection via a jack or port in the portable electronic device that is on the same face as and typically (but not necessarily) generally axially-aligned with the port. Opening 360 comprises elongated slot 362 with a series (in this case five) of semi-circular side lobes 364-368 along its length. Lobes 364-368 act as detents. In the drawings, plug 350 is nestled in detent 365. The semi-circular shape of detent 365, together with spring or other compliant member 356 that urges member 350 against the detent (in the direction of arrow 357) keeps plug 350 in position for use. The detents allow plug 350 to be moved into any of five positions along the length of slot 362.

Detents are not necessary. As an alternative, plug 350 can be adjustable across the docking area of the docking station, accomplished in any manner. For example, the plug can be movable along a slot (or perhaps a series of intersecting slots that accomplish adjustability in two dimensions) without detent positions. In this case, preferably there is enough friction to prevent the plug from moving unintentionally once it is positioned. As an example, friction could be accomplished with a compliant material (such as an elastomer) located in the slot.

FIG. 5B also shows second spring or compliance 358 that provide some vertical compliance to plug 350 via interaction with plug base 352. This vertical compliance of the second electrical connector of the inventive docking station is an optional feature that can be included in this embodiment and/or any of the other embodiments to accommodate situations in which there might need to be additional vertical compliance in the second electrical connector of the docking station to accommodate, for example, different constructions of portable electronic devices or different sizes or lengths of the plug member that is coupled to the portable electronic device. This vertical compliance, together with the extent of the width of the second electrical connector as described above, can accommodate many varieties of portable electronic devices.

Further, the docking station can be configured with different types of electrical connectors or additional electrical connectors to cover more of the docking area of the docking station to accommodate portable electronic devices with the second port or jack in varied locations. The docking station can even be designed to accommodate a second port or jack on a different face or different part of the portable electronic device than the main port of the portable electronic device. This can be accomplished by the docking station having its second electrical connector properly positioned such that either the connector itself, or a plug member coupled to the connector, can electrically couple with the jack or second port of the portable electronic device when its main port is inserted onto the main connector of the docking station.

Figure 6:
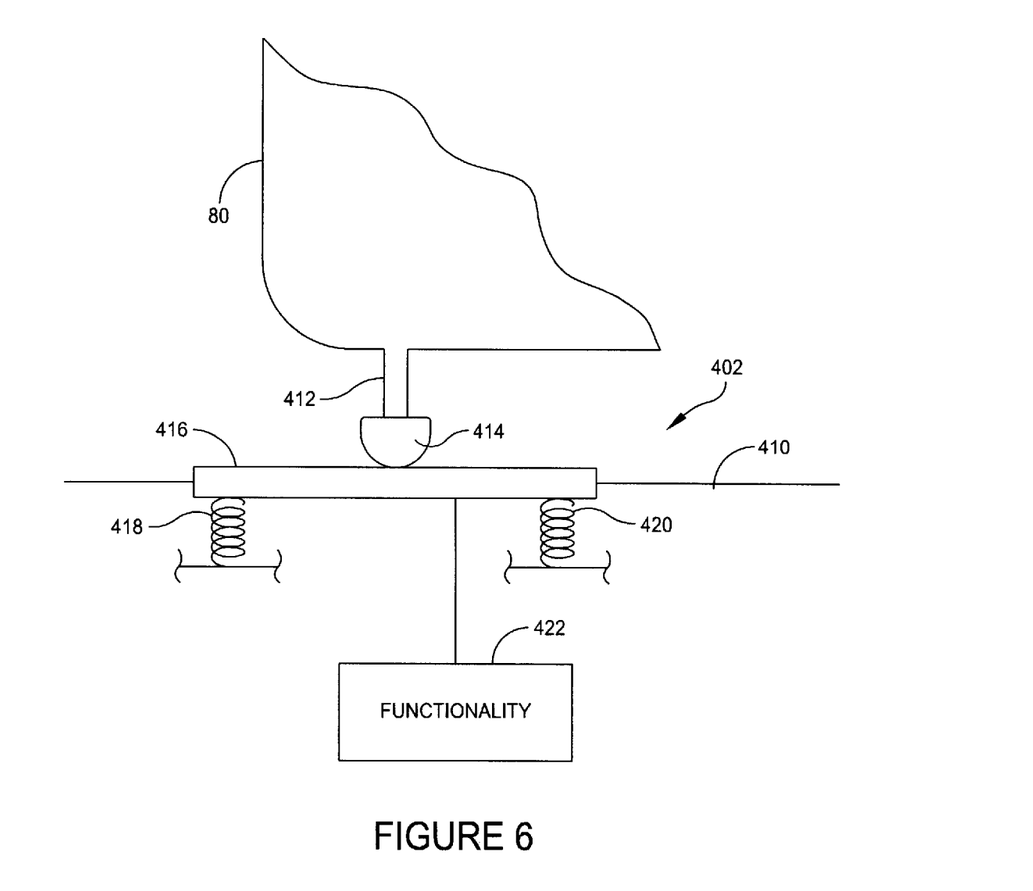
FIG. 6 is a schematic partial side view of another embodiment.

FIG. 6 schematically depicts another embodiment that illustrates additional and alternative features. Docking station system 402 accomplishes temporary electrical connection between a functionality (not shown) carried by portable electronic device 80 (e.g., a portable media player) and functionality 422 (e.g., control, audio, video, power or charging) of docking station 410. Plug member 412 in this case includes male end 414. Docking station 410 includes conductor 416 with which plug member 412 makes temporary electrical contact when device 80 is coupled to docking station 410. Contact in this case is accomplished by end 414 pushing down onto the top of conductor 416. Conductor 416 can be located at, above or below the surface of docking station 410 to accommodate a desired or particular physical docking arrangement of device 80 to docking station 410. End 414 can be (but not need be) enlarged as shown to accomplish a greater contact area with conductor 416 and thus better electrical coupling. Conductive member 416 is electrically coupled to functionality 422 carried by docking station 410. The result is that functionality 422 is electrically coupled to device 80 through the jack or other connector (not shown) of device 80 into which plug member 412 is inserted.

Conductor 416 may be provided with some vertical compliance so as to accommodate plug member end 414 being located at different vertical positions relative to the surface of docking station 410, so as to be useful with different types of portable electronic devices and different types of plug members. To accomplish such compliance, conductor 416 should be relatively stiff such that it can be moved up and down while still allowing a plug to be pushed down against it at different positions along its length. This can be accomplished by use of a conductive rail 416. Rail 416 can cover a desired area at or near the top surface of the docking area of docking station 410. In the extreme, conductor 416 could be a conductive plate that covers some or even all of the docking area. Vertical compliance is accomplished in a desired manner, such as with springs or other compliant members 418 and 420 located between the bottom of conductor 416 and a fixed portion of docking station 410.

Figure 7A:
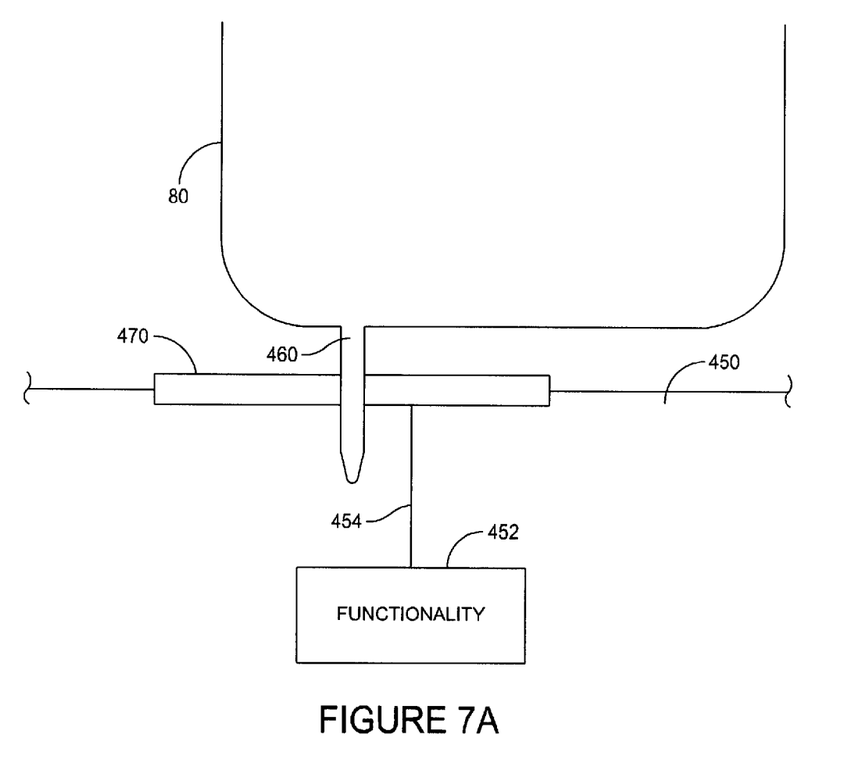
FIG. 7A is a schematic partial side view of another embodiment.
Figure 7B:
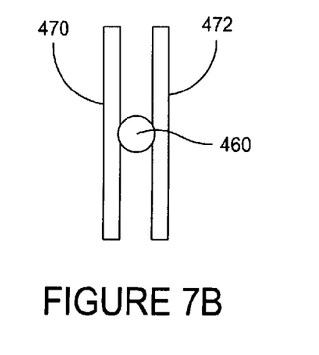
FIG. 7B is a partial top view thereof.

FIGS. 7A and 7B show a different manner of accomplishing temporary electrical connection between a plug member and a conductor of the docking station. Plug member conductive portion or end 460 contacts conductor 470 of docking station 450 when device 80 is coupled to docking station 450. The other conductive end of the two-ended plug member (not shown) is received in a port or jack of device 80 (also not shown). Functionality 452 is electrically connected to conductor 470 via conductor 454. The connection of conductive portion 460 and conductor 470 thus connects docking station functionality 452 to device 80. Conductor 470 may or may not have some lateral compliance so as to accommodate plugs of different sizes and shapes. Further, more than one such conductor can be included. For example, two conductors 470 and 472, FIG. 7B, can be located such that they are spaced and parallel to one another. Particularly if conductors 470 and 472 have some lateral compliance, this allows plugs of different widths to be inserted between conductors 470 and 472, to help ensure sufficient electrical connectivity.

Conductors can be located at desired locations on the docking station. For example, conductors could cover some or all of the surface of the docking area and/or an area below or even above the surface. There could be many closely-spaced parallel (or non-parallel) conductors spanning the docking area to accommodate a plug or other male connector at virtually any location of the device that is located proximate the docking area when the portable electronic device is coupled to the docking station.

The docking station does not need to include the multi-pin docking connector described above (such as connector 18, FIG. 1), as the docking station functionality that is temporarily connected is not connected through this connector. The docking station contemplates temporary electrical connection through one or more connectors of the portable electronic device. For example, many portable electronic devices include a 3.5 mm jack (e.g., an audio jack) and/or a USB (typically a mini or micro-USB) port to which one or more functionalities of the portable electronic device are electrically connected. One or more of these functionalities of the portable electronic device can be reached by the docking station. The docking station can include as part thereof one or more electrical connectors that make electrical contact to one or more of these device connectors or ports when the device is coupled to the docking station. Alternatively, one or more intermediate electrical connectors (e.g., a plug member) that make electrical contact to one or more of these device connectors can be separate from the docking station, and can interconnect the docking station and the portable electronic device when the portable electronic device is coupled to the docking station.

For example, the portable electronic device can include one or more non-docking connectors on one of its edges or surfaces, and not include a multi-pin docking connector (port) at all, or at least not include the port on that same edge. An example is a portable electronic device such as a cell phone with a 3.5 mm jack and a mini-USB port on one of its edges. The docking station can accommodate such devices with one or more connectors, for example with a plug that fits in the jack and a mini-USB connector that fits in the mini-USB port. These connectors can either be built-in to the docking station, or they can be double-ended intermediate connectors that are temporarily connected to both the device and the docking station.

The docking station can provide or work with any functionality that can be used by the portable electronic device, including but not limited to audio, video, data, control, power, or charging. Any one or more of these can be accommodated by including this function (or a function that works with one of these functions, e.g., a controller that accepts and transmits control signals) in the docking station.

Other implementations are within the scope of the following claims.

What is claimed:

1. A docking station for a portable electronic device that includes a first port, and one or both of a second port and a jack, the docking station comprising:
   a first electrical connector that fits into the first port when the portable electronic device is coupled to the docking station;
   a second electrical connector that is adapted to be electrically coupled to the second port or the jack when the portable electronic device is coupled to the docking station; and
   a plug member comprising a first end that is adapted to removably seat in the second port or the jack and a second end that is adapted to be electrically coupled to the second electrical connector;
   wherein when the portable electronic device is coupled to the docking station such that the first electrical connector fits into and is electrically coupled to the first port, the second electrical connector is at the same time electrically coupled to the second port or the jack.

2. The docking station of claim 1 wherein the second electrical connector is adjacent to the first electrical connector.

3. The docking station of claim 2 further comprising a contiguous docking area on a surface of the docking station, in which the first electrical connector is located in the docking area, and wherein the second electrical connector is accessible over at least some of the docking area.

4. The docking station of claim 3 wherein the second electrical connector is located in the docking area on both sides of and essentially parallel to the first electrical connector.

5. The docking station of claim 3 wherein the second electrical connector is located directly below the surface of the docking station.

6. The docking station of claim 5 further comprising an opening in the docking area directly above the second electrical connector.

7. The docking station of claim 3 wherein the second electrical connector comprises a female connector that defines a series of internal electrical contacts arranged in one or more rows.

8. The docking station of claim 7 wherein the internal electrical contacts of the female connector are located directly below the surface of the docking station.

9. The docking station of claim 8 wherein the female connector defines at least two rows of internal electrical contacts, the rows arranged essentially parallel to one another and at different distances below the surface of the docking station.

10. The docking station of claim 1 wherein the second electrical connector is compliantly mounted to the docking station.

11. The docking station of claim 1 further comprising a radio antenna electrically coupled to an antenna output contact of the second electrical connector.

12. The docking station of claim 11 wherein the portable electronic device includes a radio with its antenna input coupled to an antenna input contact of the jack, and
   wherein the second electrical connector comprises a plug member comprising a plug that is adapted to removably seat in the jack, the plug defining an external contact that electrically connects to the antenna input contact of the jack when the plug is seated in the jack.

13. The docking station of claim 12 wherein the plug member is movably coupled to the docking station such that the position of the plug relative to the first electrical connector can be changed.

14. The docking station of claim 13 wherein the docking station defines a plurality of detents that define a plurality of plug positions.

15. The docking station of claim 1 wherein the plug member is adapted to be removably coupled to both the second electrical connector and the second port or the jack.

16. The docking station of claim 15 wherein the first end of the plug member comprises a first plug that defines a first external electrical contact, and the second end of the plug member comprises a second plug that defines a second external electrical contact that is electrically coupled to the first external electrical contact.

17. The docking station of claim 16 wherein the portable electronic device includes a radio with its antenna input coupled to an antenna input contact of the jack,
   wherein the docking station further comprises a radio antenna electrically coupled to an antenna output contact of the second electrical connector, and
   wherein the first external electrical contact of the first plug electrically connects to the antenna input contact of the jack when the first plug is seated in the jack, and
   wherein the second external electrical contact of the second plug electrically connects to the antenna output contact of the second electrical connector when the second plug is electrically coupled to the second electrical connector, to thereby electrically couple the antenna to the radio through the plug member.

18. The docking station of claim 15 wherein:
   the first end of the plug member comprises a first connector adapted to fit into the second port of the portable electronic device,
   the first connector defining a first electrical contact, and
   the second end of the plug member comprises a plug that defines a second external electrical contact that is electrically coupled to the first electrical contact.

19. The docking station of claim 18 wherein the portable electronic device includes a power supply that is adapted to be supplied with power through one or more input power contacts of its second port,
   wherein the second electrical connector comprises an output power contact, and
   wherein the first electrical contact of the plug member first connector is a power contact that electrically connects to an input power contact of the second port when the first connector is seated in the second port,
   wherein the second external electrical contact of the plug electrically connects to the output power contact of the second electrical connector when the plug is electrically coupled to the second electrical connector, to thereby electrically couple the output power contact of the second electrical connector to the power supply of the portable electronic device through the plug member.

20. The docking station of claim 1 wherein the portable electronic device is a portable media player comprising a housing with the first port and the second port or jack both located at the same end of the housing.

21. A docking station for a portable media player that includes a first port, and one or both of a second port and a jack, the docking station comprising:
   a first electrical connector that fits into the first port when the portable media player is coupled to the docking station;
   a contiguous docking area on a surface of the docking station, in which the first electrical connector is located in the docking area, the docking area defining an opening adjacent to the first electrical connector;

a second electrical connector adjacent to the first electrical connector and adapted to be electrically coupled to the second port or the jack when the portable electronic device is coupled to the docking station, wherein the second electrical connector is located directly below the opening in the docking area such that the second electrical connector is accessible over at least some of the docking area; and a plug member comprising a first end that is adapted to removably seat in the second port or the jack and a second end that is adapted to be electrically coupled to the second electrical connector, wherein the plug member is adapted to be removably coupled to both the second electrical connector and the second port or the jack;

wherein when the portable electronic device is coupled to the docking station such that the first electrical connector fits into and is electrically coupled to the first port, the second electrical connector is at the same time electrically coupled to the second port or the jack.

22. The docking station of claim 21 wherein:

the first end of the plug member comprises a first plug that defines a first external electrical contact;

the second end of the plug member comprises a second plug that defines a second external electrical contact that is electrically coupled to the first external electrical contact;

the portable electronic device includes a radio with its antenna input coupled to an antenna input contact of the jack;

the docking station further comprises a radio antenna electrically coupled to an antenna output contact of the second electrical connector;

the first external electrical contact of the first plug electrically connects to the antenna input contact of the jack when the first plug is seated in the jack; and the second external electrical contact of the second plug electrically connects to the antenna output contact of the second electrical contact when the second plug is electrically coupled to the second electrical connector, to thereby electrically couple the antenna to the radio through the plug member.

23. The docking station of claim 21 wherein:

the first end of the plug member comprises a first connector adapted to fit into the second port of the portable electronic device, the first connector defining a first electrical contact;

the second end of the plug member comprises a plug that defines a second external electrical contact that is electrically coupled to the first electrical contact;

the portable electronic device includes a power supply that is adapted to be supplied with power through one or more input power contacts of its second port;

the second electrical connector comprises an output power contact;

the first electrical contact of the plug member first connector is a power contact that electrically connects to an input power contact of the second port when the first connector is seated in the second port; and the second external electrical contact of the plug electrically connects to the output power contact of the second electrical connector when the plug is electrically coupled to the second electrical connector, to thereby electrically couple the output power contact of the second electrical connector to the power supply of the portable electronic device through the plug member.

24. A method for providing a radio antenna to a radio of a portable media player that is adapted to be coupled to a docking station, the portable media player including a second port to which the antenna input of the radio is coupled, the method comprising:

providing a radio antenna that is part of the docking station;

providing a first electrical connector that is part of the docking station, the first electrical connector configured to engage a first port of the portable media player and electrically couple at least one of control, charging and audio signals between the docking station and the portable media player;

providing a second electrical connector that is part of the docking station, the second electrical connector electrically coupled to the radio antenna that is part of the docking station;

providing a conductive plug that is insertable into and removable from the second port of the portable media player;

inserting the plug into the second port of the portable media player; and either together with the plug insertion into the second port or after the plug is inserted into the second port, coupling the portable media player to the docking station such that first electrical connector of the docking station is electrically coupled to the first port of the portable media player, and substantially simultaneously the plug is electrically coupled to the second electrical connector of the docking station, to thereby electric ally couple the antenna to the radio through the second electrical connector of the docking station and the plug, and at the same time electrically couple at least one of the control, charging and audio signals between the docking station and the portable media player through the first electrical connector of the docking station and the first port of the portable media player.

* * * * *